(12) United States Patent
Aoki et al.

(10) Patent No.: US 7,659,003 B2
(45) Date of Patent: Feb. 9, 2010

(54) SILICONE COMPOSITION AND A PRESSURE SENSITIVE ADHESIVE FILM HAVING A PRESSURE SENSITIVE ADHESIVE LAYER MADE FROM THE COMPOSITION

(75) Inventors: Shunji Aoki, Matsuida-machi (JP); Akira Yamamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 296 days.

(21) Appl. No.: 11/258,895

(22) Filed: Oct. 27, 2005

(65) Prior Publication Data

US 2006/0094834 A1    May 4, 2006

(30) Foreign Application Priority Data

Oct. 28, 2004  (JP) .............................. 2004-314694
Oct. 26, 2005  (JP) .............................. 2005-311174

(51) Int. Cl.
*B32B 9/04*      (2006.01)
(52) U.S. Cl. ..................... 428/447; 525/478; 528/15; 528/31; 528/32
(58) Field of Classification Search ................ 428/447; 528/15, 31, 32; 525/478
See application file for complete search history.

(56) References Cited

U.S. PATENT DOCUMENTS

| 4,521,471 | A | | 6/1985 | Merrill | |
| 5,013,772 | A | * | 5/1991 | Fujiki et al. ................. 523/213 |
| 5,147,691 | A | * | 9/1992 | Shimamoto et al. ......... 427/387 |
| 5,366,809 | A | * | 11/1994 | Schmidt et al. ............. 428/447 |
| 5,399,614 | A | * | 3/1995 | Lin et al. .................... 524/588 |
| 6,406,793 | B1 | * | 6/2002 | Aoki .......................... 428/447 |
| 2003/0027913 | A1 | * | 2/2003 | Yamamoto et al. .......... 524/430 |
| 2003/0091837 | A1 | * | 5/2003 | Aoki .......................... 428/447 |

FOREIGN PATENT DOCUMENTS

| EP | 0370689 | A2 | 5/1990 |
| EP | 0581539 | A2 | 2/1994 |
| EP | 0614959 | A1 | 9/1994 |
| EP | 0641848 | A2 | 3/1995 |
| EP | 1295927 | A1 | 3/2003 |
| JP | 2004-225005 | A | 8/2004 |

* cited by examiner

*Primary Examiner*—Margaret G Moore
(74) *Attorney, Agent, or Firm*—Birch, Stewart, Kolasch & Birch, LLP

(57) ABSTRACT

A pressure sensitive adhesive film comprising a substrate film and a pressure sensitive adhesive layer formed on a surface of the substrate film, said pressure sensitive adhesive layer being prepared from (A) a silicone composition comprising a diorganopolysiloxane having at least two alkenyl groups per molecule and (C) a polyorganosiloxane having an SiH bond, characterized in that the alkenyl groups are contained in an amount of from 0.0007 to 0.05 mole per 100 g of the diorganopolysiloxane (A) and that the polyorganosiloxane (C) is contained in such an amount that a molar ratio of the SiH bond to the alkenyl group of the diorganopolysiloxane (A) ranges from 0.5 to 20.

10 Claims, No Drawings

SILICONE COMPOSITION AND A PRESSURE SENSITIVE ADHESIVE FILM HAVING A PRESSURE SENSITIVE ADHESIVE LAYER MADE FROM THE COMPOSITION

CROSS REFERENCE

This application claims benefit of Japanese Patent application No. 2004-314694 filed on Oct. 28, 2004, and Japanese Patent application No. 2005-311174 filed on Oct. 26, 2005, the contents of which are hereby incorporated by reference.

FIELD OF THE INVENTION

The present invention relates to a pressure sensitive adhesive film and a silicone composition to be used to form an adhesive layer of the film. The pressure sensitive adhesive film is suitable to apply on a surface of a flat panel display.

DESCRIPTION OF THE PRIOR ART

Flat panel displays are widely used as displays of electronic or electric appliances. Examples of the display include CRT displays, liquid crystal displays, plasma displays, organic electroluminescence displays, inorganic electroluminescence displays, LED displays, Surface-Conduction Electron-emitter displays, Field Emission Display and touch panels using these displays. To protect the displays from damages, dirt, fingerprints, electric charges, and strangers' glances or to prevent glare or refection, various kinds of films are applied on the displays.

These films, even used for a display placed inside an electric appliance, should not entrap bubbles when they are applied on displays and, if bubbles are entrapped, they should be removed easily. The applied film should not slide or peel on its own, but be easily peeled by hand when it is to be replaced with another film.

As a pressure sensitive adhesive layer of the film, a pressure sensitive adhesive comprising an organic resin such as an acrylic resin and a urethane resin have been conventionally used. A film using such an adhesive composition, however, is difficult to stick without entrapping bubbles. When bubbles are entrapped, they cause unevenness in luminance, brightness and color in a display, so that the film should be peeled and re-stuck or the bubbles should be push out with fingers. These re-sticking of the film and pushing out sometimes damage the display.

Japanese Patent Application Laid-Open No. 2004-225005 discloses a solvent free organopolysiloxane composition. A pressure sensitive adhesive layer prepared by curing the composition does not have sufficient adhesion strength, so that the adhesive layer sometimes peel off from the substrate. This peeling cannot be prevented completely by treating the substrate with corona discharge or a primer. Further, an applied composition is sometimes strongly electrostatically charged to flow on the substrate before cured, resulting in an adhesive layer having an uneven thickness.

SUMMARY OF THE INVENTION

The object of the present invention is to provide a pressure sensitive film suitable for a flat panel display which film can be applied on a display without entrapping bubbles and, after applied, does not slide or peel on its own but can be easily peeled by hand. Another object of the present invention is to provide a composition for a pressure sensitive adhesive of the film.

After extensive studies, the inventors have found that the above object can be attained by a silicone composition having a specific degree of curability.

Thus, the present invention is a pressure sensitive adhesive film comprising a substrate film and a pressure sensitive adhesive layer formed on a surface of the substrate film, said pressure sensitive adhesive layer being prepared from (A) a silicone composition comprising a diorganopolysiloxane having at least two alkenyl groups per molecule and (C) a polyorganosiloxane having an SiH bond, characterized in that the alkenyl groups are contained in an amount of from 0.0007 to 0.05 mole per 100 g of the diorganopolysiloxane (A) and that the polyorganosiloxane (C) is contained in such an amount that a molar ratio of the SiH bond to the alkenyl group of the diorganopolysiloxane (A) ranges from 0.5 to 20.

The aforesaid present film can be applied on an object without entrapping bubbles. The applied film well sticks to the object without sliding or peeling. The film can be peeled off easily by hand.

DESCRIPTION OF THE PREFERRED EMBODIMENTS

In the present composition, component (A) is a polydiorganosiloxane having at least two alkenyl groups per molecule. Examples of such polydiorganosiloxane are represented by any one of the following formulae,

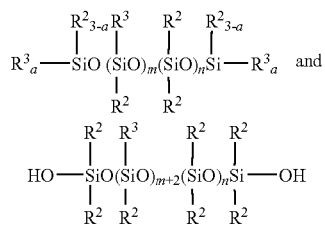

wherein, $R^2$ is a substituted or unsubstituted monovalent hydrocarbon group which does not have an aliphatic unsaturated bond; $R^3$ is an organic group having an alkenyl group; a is an integer of from 0 to 3, preferably 1; m is an integer of 0 or larger, provided that m is 2 or larger when a is zero; n is an integer of 10 or larger, with a sum of m and n being such that the polydiorganosiloxane has a viscosity of 10 mPa·s or larger.

Preferably, $R^2$ has 1 to 10 carbon atoms. Examples of $R^2$ include alkyl groups such as methyl, ethyl, propyl, and butyl groups; alicyclic group such as cyclohexyl group; aryl groups such as phenyl and tolyl groups. $R^2$ may have a substituent group such as a halogen, amino, hydroxyl, or cyano group to be, for example, 3-aminopropyl group, 3,3,3-trifluoropropyl group, 3-hydroxypropyl group or 3-cyanopropyl group. Preferred $R^2$ are methyl and phenyl groups.

$R^3$ preferably has 2 to 10 carbon atoms. Examples of $R^3$ include vinyl, allyl, hexenyl, octenyl, acryloylpropyl group, acryloylmethyl group, methacryloylpropyl group, cyclohexenylethyl group, and vinyloxypropyl group, among which a vinyl group is preferred from industrial viewpoint. In the present composition, component (A) is characterized in that it contains alkenyl groups in an amount of from 0.0007 to 0.05 mole per 100 g of component (A). Within the range, a suitable adhesive strength both to a surface of a flat panel display and a substrate film can be attained. When a mass ratio of Component (A) to Component (B) is in the range of from 55/45 to 40/60, Component (A) preferably has alkenyl groups in an amount of from 0.005 to 0.05 mole/100 g.

The polydiorganosiloxane (A) may preferably be oily or gummy. Oily component (A) preferably has a viscosity at 25° C. of 10 mPa·s or higher, particularly 100 mPa·s or higher. If the viscosity is below the aforesaid lower limit, a composition may not be hardened enough, or cohesive strength may be too small. When component (A) is gummy, a viscosity of a 30 wt % solution of it in toluene is preferably 100,000 mPa·s or lower. If the viscosity exceeds the aforesaid upper limit, a composition may be so viscous that the composition is difficult to be agitated in its preparation process. The component (A) may be a mixture of two or more kinds of the polydiorganosiloxane.

Typically, the polydiorganosiloxane (A) is prepared by subjecting cyclic monomers such as octamethylcyclotetrasiloxane to a ring-opening polymerization. The polymerization product is preferably purified by heating at a reduced pressure while passing inert gas in the product to remove low molecular weight cyclic siloxanes.

Component (B) is a polyorganosiloxane comprising a $R^1_3SiO_{0.5}$ unit and a $SiO_2$ unit in a molar ratio of $R^1_3SiO_{0.5}$ unit to $SiO_2$ unit of from 0.6 to 1.7. If the ratio is below the aforesaid lower limit, adhesion strength or tackiness may be lower. If the ratio exceeds the aforesaid upper limit, adhesion strength and holding power may be lower.

$R^1$ is a substituted or unsubstituted monovalent hydrocarbon group having 1 to 10 carbon atoms. Examples of $R^1$ include alkyl groups such as methyl, ethyl, propyl, and butyl groups; alicyclic groups, phenyl group, a vinyl group, an allyl group and a hexenyl group. $R^1$ may have a substituent group such as a halogen, amino, hydroxyl, or cyano group to be, for example, 3-aminopropyl group, 3,3,3-trifluoropropyl group, 3-hydroxypropyl group or 3-cyanopropyl group.

Component (B) may have an OH-group in an amount of from 0.01 to 4.0 wt % based on a total weight of component (B). If the amount is below the aforesaid lower limit, cohesive strength of a composition may be too low. If the amount exceeds the upper limit, tackiness of a cured composition may be too small.

Component (B) may be a mixture of two or more of the polyorganosiloxane. Component (B) may also have $R^1SiO_{1.5}$ unit and $R^1_2SiO$ unit in such amounts that they do not adversely affect properties of the present composition.

A mass ratio of Component (A) to Component (B), (A)/(B), ranges from 95/5 to 40/60, preferably from 95/5 to 55/45. A composition with the ratio being below the aforesaid lower limit may give a film which entraps many bubbles when it is applied on an object and may be difficult to peel due to too large adhesion strength.

Component (C) is an organohydrogenpolysiloxane crosslinking agent having at least 2, preferably at least 3, hydrogen atoms bonded to silicon atoms and may be linear, branched or cyclic siloxane.

Examples of component (C) are as shown below, but not limited thereto.

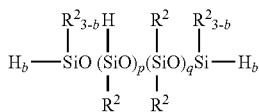

-continued

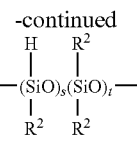

In the above formulae, each $R^2$ may be the same or different from other $R^2$ and is a substituted or unsubstituted monovalent hydrocarbon group having no aliphatic unsaturated group; b is 0 or 1; p and q each is an integer of 0 or larger, provided that p is 2 or larger when b is 0, and a sum of p and q is such that the organohydrogenpolysiloxane has a viscosity of from 1 to 5,000 mPa·s at 25° C.; s is an integer of 2 or larger, t is an integer of 0 or larger with s+t≧3, preferably 8≧s+t≧3.

Examples of $R^2$ include alkyl groups such as methyl, ethyl, propyl, and butyl groups; alicyclic group such as cyclohexyl group; aryl groups such as phenyl and tolyl groups. $R^2$ may have a substituent group such as a halogen, amino, hydroxyl, or cyano group to be, for example, 3-aminopropyl group, 3,3,3-trifluoropropyl group, 3-hydroxypropyl group or 3-cyanopropyl group. Preferred $R^2$ are methyl and phenyl groups.

Preferably, a viscosity at 25° C. of the organohydrogenpolysiloxane (C) ranges from 1 to 5,000 mPa·s, more preferably from 5 to 500 mPa·s. Component (C) may be a mixture of two or more of the organohydrogenpolysiloxane.

Component (C) may be used in such an amount that a molar ratio of the SiH bond in component (C) to the alkenyl group of component (A) ranges from 0.5 to 20, preferably from 0.8 to 15. If the ratio is below the aforesaid lower limit, crosslinking density may be too low to give sufficient cohesive strength or holding power. If the ratio exceeds the aforesaid upper limit, crosslinking density may be too high to attain appropriate adhesion strength and tackiness.

Component (D) is a retarder which prevents the adhesive composition from becoming thicker or from gelling during the preparation of the composition or before heat curing the composition applied on a substrate. Examples of component (F) include 3-methyl-1-butyn-3-ol, 3-methyl-1-pentyn-3-ol, 3,5-dimethyl-1-hexyn-3-ol, 1-etynylcyclohexanol, 3-methyl-3-trimethylsiloxy-1-butyn, 3-methyl-3-trimethylsiloxy-1-pentyn, 3,5-dimethyl-3-trimethylsiloxy-1-hexyn, 1-ethynyl-1-trimethysiloxy cyclohexane, bis(2,2-dimethyl-3-butynoxy)dimethyl silane, 1,3,5,7-tetramethyl-1,3,5,7-tetravinyl cyclotetrasiloxane, and 1,1,3,3-tetramethyl-1,3-divinyl disiloxane.

Preferably, component (D) is incorporated in the composition in an amount, based on a total of components (A) and (B) of 100 parts by weight, of from 0 to 8.0 parts by weight, more preferably 0.05 to 2.0 parts by weight. If the amount exceeds the aforesaid upper limit, the composition may not be cured enough.

Component (E) is a catalyst for an addition reaction. Examples of the catalyst (E) include chloroplatinic acid, alcohol solutions of chloroplatinic acid, reaction products of chloroplatinic acid with alcohols, reaction products of chloroplatinic acid with olefin compounds, and reaction products of chloroplatinic acid with siloxane having a vinyl group, a platinum-olefin complex, a complex of platinum with a siloxane having a vinyl group, rhodium complexes, and ruthenium complexes. These may be in the form of a liquid dissolved or dispersed in a solvent such as isopropanol and toluene, or in a silicone oil.

Component (E) is incorporated in the composition preferably in such an amount that the amount as noble metal ranges from 5 to 2,000 ppm, particularly from 10 to 500 ppm. If the amount is below the aforesaid lower limit, insufficient curing and lower crosslinking density may occur, resulting in too small holding power. If the amount exceeds the aforesaid upper limit, a serviceable time of the composition may be shorter.

Examples of organic solvent (F) include aromatic hydrocarbon solvents such as toluene and xylene; aliphatic hydrocarbon solvents such as hexane, heptane, octane, isooctane, decane, cyclohexane, methylcyclohexane, and isoparaffin; hydrocarbon solvents such as industrial gasoline, petroleum benzene, and solvent naphtha; ketone solvents such as acetone, methylethylketone, 2-pentanone, 3-pentanone, 2-hexanone, 2-heptanone, 4-heptanone, methylisobutylketone, diisobutylketone, acetonylacetone, an cyclohexanone; ester solvents such as ethyl acetate, propyl acetate, isopropyl acetate, butyl acetate, and isobutyl acetate; ether solvents such as diethyl ether, dipropyl ether, diisopropyl ether, dibutyl ether, 1,2-dimethoxyethane, and 1,4-dioxane; solvents having both ester and ether moieties such as 2-methoxyethyl acetate, 2-ethoxyethyl acetate, propylene glycol monomethyl ether acetate, 2-butoxyethyl acetate; silicone solvents such as hexamethyldisiloxane, octamethyltrisiloxane, octamethylcyclotetrasiloxane, decamethylcyclopentasiloxane, tris(trimethylsiloxy)methylsilane, and tetraquis(trimethylsiloxy)silane; and a mixture thereof.

Preferred are aliphatic hydrocarbon solvents such as hexane, heptane, octane, isooctane, decane, cyclohexane, methylcyclohexane, and isoparaffin. Also preferred is a mixture of the aliphatic hydrocarbon solvent with an ether solvent, an ester solvent, or a solvent having both ester and ether moieties.

The present composition can be prepared by mixing components (A), (B), (C), (D), and (F). To prepare the present film, the composition may be further diluted with an organic solvent, if needed, to which component (E) is added and mixed, and then applied to a substrate film of various kinds as described below.

A part or all of the components (A) and (B) may be added as a product prepared by reacting the part or all of the components (A) and (B) in the presence of a basic catalyst and a part or all of the component (F), if needed, to remove residual hydroxyl groups in the components by etherification.

Examples of the basic catalyst include metal hydroxides such as lithium hydroxide, sodium hydroxide, potassium hydroxide, and calcium hydroxide; carbonates such as sodium carbonate and potassium carbonate; bicarbonates such as sodium bicarbonate; organic metals such as sodium methoxide, potassium buthoxide and butyl lithium; a complex of potassium hydroxide with a polysiloxane; nitrogen compounds such as ammonium gas, ammonia water, methyl amine, trimethylamine, and triethylamine. Preferred are ammonia gas and ammonia water. The reaction may be carried out at a temperature of from 20 to 150° C. Typically, a temperature of from room temperature to a reflux temperature of component (F) is employed. The reaction time may range from 0.5 to 10 hours, preferably from 1 to 6 hours.

After the reaction, a neutralizing agent may be added to neutralize the basic catalyst, if needed. Examples of the neutralizing agent include acidic gases such as hydrogen chloride and carbon dioxide; organic acids such as acetic acid, n-octylic acid and citric acid; and mineral acids such as hydrochloric acid, sulfuric acid, and phosphoric acid.

In addition to the above components, the present silicone adhesive composition may comprise optional components. Examples of such components include non-reactive polyorganosiloxanes having no alkenyl group such as polydimethylsiloxane and polydimethyldiphenylsiloxane; antioxidants such as phenol type, quinone type, amine type, phosphorus type, phosphite type, sulfur type, and thioether type antioxidants; photostabilizers such as triazole type and benzophenone type photostabilizers; flame retardants such as phosphate ester type, halogen type, phosphorus type, and antimony type flame retardants; antistatic agents such as cationic surfactants, anionic surfactants, and nonionic surfactants; solvents for lowering the viscosity in application, for example, aromatic solvents such as toluene and xylene, aliphaticsolvents such as hexane, octane and isoparaffins, ketones such as methyl ethyl ketone and methyl isobutyl ketone, esters such as ethyl acetate and isobutyl acetate, and ethers such as diisopropyl ether and 1,4-dioxane; and mixtures thereof; and dyes and pigments.

An adhesive layer prepared from the present silicone composition shows adhesion strength to a stainless steel plate measured according to a 180-degree peel test specified in the Japanese Industrial Standards Z 0237, using an adhesive film having 30 μm-thick adhesive layer on 25 μm-thick polyethylene terephthalate substrate film. Preferably, the adhesion strength ranges from 0.01 to 2.5N/10 mm, more preferably from 0.01 to 1.5 N/10 mm, and most preferably from 0.1 to 0.5 N/10 mm. An adhesive layer having the strength below the aforesaid lower limit may not stick to a display surface. A film having the strength above the aforesaid upper limit may not be easy to peel by hand.

The present silicone composition for a pressure sensitive adhesive can be applied on various substrates and cured to form a pressure sensitive adhesive layer.

Examples of the substrate film include films of plastic such as polyester, poly(meth)acrylate, polycarbonate, polyethylene, polypropylene, polystyrene, polyamide, polyimide, polyphenylene sulfide, polytetrafluoroethylene, polyvinylchloride, polyurethane, triacetylcellulose, polyacetal, polynorbornene sold under the trade name of Arton from JSR Co., cycloolefinic resin sold under the trade name of ZEONOR from ZEON Co., epoxy resin, and phenolic resin, and a laminated film comprising a plurality of these films. Preferably, polyester such as polyethylene terephthalate, polybutylene terephthalate, and polyethylene naphthalate, poly(meth)acrylate, and polycarbonate are used.

A thickness of the substrate film may be selected depending on plastic, but typically ranges from 10 to 300 μm, more typically from 20 to 200 μm.

To improve adhesion between the substrate and the pressure sensitive adhesive layer, the substrate may be subjected to primer coating treatment, corona treatment, etching plasma treatment or sandblast treatment. Preferably, the substrate film is treated with corona discharge and then with a primer coating.

Primer compositions which can be used in the present invention include a condensation type composition comprising a polydiorganosiloxane having SiOH groups at both ends, a polysiloxane having a SiH group and/or a polysiloxane having an alkoxy group, and a condensation catalyst; and an addition type composition comprising a polydiorganosiloxane having an alkenyl groups such as a vinyl group and a polysiloxane having a SiH group and an addition catalyst.

An example of the condensation type primer composition is described in Japanese Patent Publication No. S54-44017, which composition comprises a polydiorganosiloxane having a hydroxyl groups at an end, an organohydrogenpolysiloxane, and a tin salt of an organic carboxylic acid.

Another example of the condensation type primer composition is described in Japanese Patent Publication No. S54-

44017, which composition comprises an organopolysiloxane (a) represented by the following general formula,

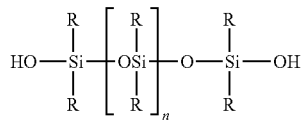

wherein R is a substituted or unsubstituted monovalent hydrocarbon group and n is an integer of 30 or lager, an organohydrogenpolysiloxane (b) having at least three SiH bonds and a substituted or unsubstituted monovalent hydrocarbon group, a vinylic and/or an acrylic copolymer (c) having a hydrolyzable silyl group and a metal salt of an organic carboxylic acid (e).

An example of the addition type silicone primer composition is described in Japanese Patent Publication S60-11950, which composition comprises an organopolysiloxane having a vinyl group, an organohydrogenpolysiloxane, and a platinum catalyst.

Another example of the primer composition is described in Japanese Patent Application Laid-Open No. 2002-338890, which composition comprises a diorganopolysiloxane (A) having alkenyl group at both ends and an average degree or polymerization of from 500 to 2000, said alkenyl group being present in a molar concentration of from 0.001 to 0.005 mole per 100 g of the diorganopolysiloxane, an organohydrogenpolysiloxane (B) having at least two SiH bonds, a platinum catalyst (C), and a retarder (D).

Still another example of the primer composition is described in Japanese Patent Application Laid-Open No. 2004-307653, a diorganopolysiloxane (A) having alkenyl group at both ends and a phenyl group in an amount of from 0.5 to 60 mole %, an organohydrogenpolysiloxane (B) having at least two SiH bonds, a platinum catalyst (C), and a retarder (D).

In the present invention, both type of the primer composition may be used.

A film surface opposite to the surface on which an adhesive layer is provided is preferably treated to be damage-proof, dirt-proof, fingerprints-proof, anti-glare, anti-reflection or antistatic. The treatment can be performed before or after the adhesive layer is provided.

Examples of the damage-proof treatment agent, i.e., hard coat treatment, include acrylate, silicone, oxycetane, inorganic materials, and organic hybrid materials hard coating agents.

Examples of the dirt-proof treatment agent include fluorinated, silicone, ceramic, and photocatalyst dirt-proof treatment agents.

Examples of the anti-glare treatment include wet treatment by applying a fluorinated or a silicone anti-glare agent and dry treatment by vapor deposition or sputtering.

Examples of the antistatic agent include surfactants, silicones, organoborons, electroconductive polymers, metal oxides, metal vapors.

To apply the composition, any known means or method for application may be used, for example, a comma coater, a lip coater, a roll coater, a die coater, a knife coater, a blade coater, a rod coater, a kiss-roll coater, and a gravure coater; screen printing, dipping and casting methods.

The amount of the composition to be applied on a substrate may be such that a cured adhesive layer has a thickness of from 2 to 200 μm, particularly from 3 to 100 μm.

Curing may be carried out at a temperature of from 80 to 130° C. for 30 seconds to 3 minutes.

The adhesive tape can be prepared by applying the silicone composition on the substrate film as described above, or by applying the composition on a release film or a release paper having been coated with a releasing agent, curing the composition and then transferring the cured composition to the aforesaid substrate film. A peelable protective film may be applied on the present pressure sensitive adhesive layer, if necessary, to protect the layer during storage or transportation.

The film prepared by using the present pressure sensitive adhesive silicone composition are used for flat panel displays for displaying letters, symbols, and images of various apparatuses, such as TV monitors, computer monitors, handheld terminal monitors, surveillance monitors, video cameras, digital cameras, cell phones, instrumental panel displays of automobiles, various facilities, instruments, and tools, automatic ticket vending machine, and automated teller machine. Examples include displays such as CRT displays, liquid crystal displays, plasma displays, organic electroluminescence displays, inorganic electroluminescence displays, LED displays, Surface-Conduction Electron-emitter displays, Field Emission Display and touch panels using these displays.

The present film is used to protect these displays from damages, dirt, fingerprints, electric charges, or strangers' glances or to prevent refection on the displays.

EXAMPLES

The present invention will be explained with reference to the following Examples, but not limited thereto. The term "parts" means parts by weight, "Me" means a methyl group, "Vi" means a vinyl group, and "Ph" means a phenyl group.

I. Test Methods

The following test methods were used.

Adhesion Strength

A pressure sensitive adhesive film was prepared by applying a solution of a silicone adhesive composition on a 25 μm thick polyethylene terephthalate film with an applicator in such a thickness that a cured adhesive layer at 120° C. for 1 minute has a thickness of 30 μm. A 10 mm wide tape sliced from the film was tested according to the 180-degree peel test specified in the Japanese Industrial Standards Z 0237 as follows.

The tape was attached to a stainless steel plate and pressed onto the stainless steel plate by rolling a rubber-lined roller of 2 kg in weight back and forth in two cycles on the tape. After leaving the stainless steel plate with the tape thereon at room temperature for about 20 hours, a force in N/10 mm required to peel the tape off from the steel plate in 180 degrees by pulling at a speed of 300 mm/minute was measured using a tensile tester.

Holding Power

A pressure sensitive adhesive tape was prepared as in the adhesion strength test. A tape of about 75 mm in length and 25 mm in width was attached in an area of 25 by 25 mm on a lower end of a vertically held stainless steel plate. At the lower end of the tape, a weight of 1 kg was hung. After leaving the plate at 150° C. for 1 hour, a displacement of the position of the upper end of the tape before and after this 1 hour was measured with a microscope.

Bubble Entrapment

The silicone primer composition was applied on a corona-treated surface of 75 μm thick polyethylene terephthalate film one surface of which has been treated with corona. The primer composition was applied in such an amount that 0.5 g/m² of the composition was remain after cured at 120° C. for 30 seconds. On the primer layer, a silicone composition for a pressure sensitive adhesive was applied with an applicator in such an amount that a thickness after cured is 30 µm. The applied composition was cured 120° C. for 1 minute to prepare a pressure sensitive adhesive film. From the film, a film of 10 cm width by 20 cm length was cut out and stuck on a glass plate at the shorter edge and then along the longer edge. During sticking the film, it was visually observed whether the film entrapped bubbles or not and was rated according to the following criteria.

A: No bubble was entrapped to allow very good sticking.

B: Some bubbles were entrapped but could be easily removed by pushing on a film with a finger.

C: Bubbles were entrapped and could no be push out.

Peelability

The film applied on the glass plate as in the bubble entrapment test was peeled off from the glass plate by hand. Peelability was rated according to the following criteria.

A: A film was easily peeled by hand without fold or deformation and there was no adhesive left on a glass plate.

B: A film could be peeled by hand but folded or deformed and there was no adhesive left on a glass plate.

C: A film could be peeled by hand but folded or deformed and a part of an adhesive was left on a glass plate Adhesion Strength to a Substrate Film An adhesive layer of a film prepared as in the bubble entrapment test was scrubbed with a finger cushion and observed whether it was peeled off or not. In the table 1, each rating means as follows.

A: An adhesive layer was not peeled.

B: An adhesive layer was partly peeled.

C: A whole adhesive layer was peeled.

II. Corona Treatment, Primer Treatment

In the examples and comparative examples, substrate films were corona treated and then treated with a primer, unless otherwise specified. For the primer treatment, a condensation type silicone primer composition, KR-3006A/CAT-PS-1, ex Shin-Etsu Chemical Co., Ltd., was used which composition comprises a diorganopolysiloxane, KE76S, ex Shin-Etsu Chemical Co., Ltd., an organohydrogenpolysiloxane, KF-99, ex Shin-Etsu Chemical Co., Ltd., and dibutyl tin diacetate, CAT-PS-1, as condensation reaction catalyst.

Example 1-1

Mixed were 90 parts of a polydimethylsiloxane of the following formula, herein after referred to as "polydimethylsiloxane A1", having a vinyl group in an amount of 0.002 mole/100 g and a viscosity in a 30% solution in toluene of 5,000 mPa·s,

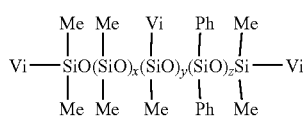

wherein x=3,800, y=4 and z=0, 16.7 parts of a 60% solution in toluene of polysiloxane, herein after referred to as "polysiloxane B", comprising $Me_3SiO_{0.5}$ unit and $SiO_2$ unit with a ratio of $Me_3SiO_{0.5}$ unit/$SiO_2$ unit being 0.85, and 60 parts of toluene.

To 100 parts of the mixture thus obtained, 0.35 part of a polyorganosiloxane having SiH bonds of the following formula, herein after referred to as "polyorganosiloxane C1",

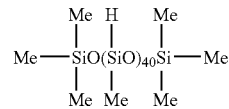

and 0.20 part of ethynylcyclohexanol were added and mixed.

To 100 parts of the mixture containing 60 wt % of siloxanes, 50 parts of toluene, and 0.5 part of a solution of a platinum complex with a siloxane having a vinyl group having a concentration as platinum of 0.05 wt % in toluene, herein after referred to as "the platinum complex solution", were added. The silicone composition for pressure sensitive adhesive thus obtained were evaluated according to the aforesaid test methods.

Referential Example 1

The silicone composition prepared in Example 1 above was applied on a 75 µm thick polyethylene film which was not corona-treated nor primer-treated. The adhesive film thus obtained was subjected to measurement of the adhesion strength to a substrate.

Referential Example 2

The silicone composition prepared in Example 1 was applied on a 75 µm thick polyethylene film which was corona-treated but not primer-treated. The adhesive film thus obtained was subjected to measurement of the adhesion strength to a substrate.

Example 1-2

The silicone composition prepared in Example 1 was applied on a 75 µm thick polyethylene film which was not corona-treated but primer-treated. The adhesive film thus obtained was evaluated according to the aforesaid test methods.

Example 2

A solution was prepared by mixing 70 parts of a polydimethylsiloxane of the following formula, herein after referred to as "polydimethylsiloxane A2", having a vinyl group in an amount of 0.002 mole/100 g and a viscosity in a 30% solution in toluene of 16,000 mPa·s,

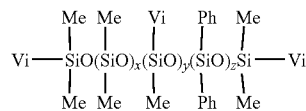

wherein x=6,600, y=8 and z=0, 50 parts of a 60% solution of the polysiloxane B in toluene, and 46.7 parts of toluene, to which 0.5 part of 28% solution of ammonium in water was added and mixed at room temperature for 6 hours.

Then, the mixture obtained was heated under reflux for 4 hours to removed ammonia gas and water. After cooled, fresh toluene was added to compensate for distilled off toluene. To 100 parts of the product thus obtained, 0.27 part of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 3

A solution was prepared by mixing 70 parts of a polydimethylsiloxane of the following formula, herein after referred to as "polydimethylsiloxane A3", having a vinyl group in an amount of 0.002 mole/100 g and a viscosity in a 30% solution in toluene of 15,000 mPa·s,

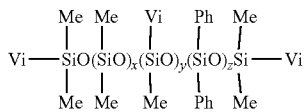

wherein x=4,500, y=7 and z=500, 50 parts of a 60% solution of the polysiloxane B in toluene, and 46.7 parts of toluene, to which 0.5 part of 28% solution of ammonium in water was added and mixed at room temperature for 6 hours.

Then, the mixture was heated under ref lux for 4 hours to removed ammonia gas and water. After cooled, fresh toluene was added to compensate for distilled off toluene. To 100 parts of the reaction product thus obtained, 0.27 part of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 4

A solution was prepared by mixing 75 parts of a polydimethylsiloxane of the following formula, herein after referred to as "polydimethylsiloxane A4", having a vinyl group in an amount of 0.04 mole/100 g and a viscosity in a 30% solution in toluene of 12,000 mPa·s,

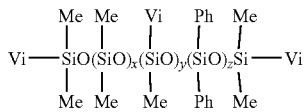

wherein x=5,630, y=170 and z=0, 41.7 parts of a 60% solution of the polysiloxane B in toluene, and 50 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 2.31 parts of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 5

A solution was prepared by mixing 50 parts of a polydimethylsiloxane of the following formula, herein after referred to as "polydimethylsiloxane A5", having a vinyl group in an amount of 0.04 mole/100 g and a viscosity in a 30% solution in toluene of 23,000 mPa·s,

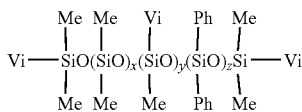

wherein x=7,760, y=240 and z=0, 83.3 parts of a 60% solution of the polysiloxane B in toluene, and 33.4 parts of toluene, to which 0.5 part of 28% solution of ammonium in water was added and mixed at room temperature for 6 hours.

Then, the mixture was heated under ref lux for 4 hours to removed ammonia gas and water. After cooled, fresh toluene was added to compensate for distilled off toluene. To 100 parts of the reaction product thus obtained, 1.54 parts of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 6

A solution was prepared by mixing 50 parts of a polydimethylsiloxane of the following formula, herein after referred to as "polydimethylsiloxane A6", having a vinyl group in an amount of 0.007 mole/100 g and a viscosity in a 30% solution in toluene of 21,000 mPa·s,

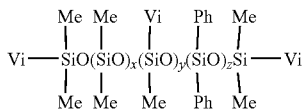

wherein x=7,560, y=38 and z=0, 83.3 parts of a 60% solution of the polysiloxane B in toluene, and 33.4 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 0.40 parts of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 7

A solution was prepared by mixing 40 parts of a polydimethylsiloxane of the following formula, herein after referred to as "polydimethylsiloxane A7", having a vinyl group in an amount of 0.02 mole/100 g and a viscosity in a 30% solution in toluene of 20,000 mPa·s,

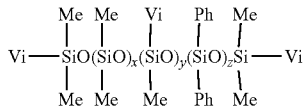

wherein x=7,290, y=110 and z=0, 100 parts of a 60% solution of the polysiloxane B in toluene, and 26.7 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 0.62 part of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Example 8

A solution was prepared by mixing 50 parts of a polydimethylsiloxane of the following formula, herein after referred to as "polydimethylsiloxane A8", having a vinyl group in an amount of 0.001 mole/100 g and a viscosity in a 30% solution in toluene of 24,000 mPa·s,

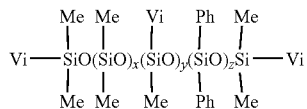

wherein x=8,300, y=4 and z=0, and 83.3 parts of a 60% solution of the polysiloxane B in toluene, and 33.4 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 0.19 part of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Comparative Example 1

A solution was prepared by mixing 50 parts of a polydimethylsiloxane of the following formula, herein after referred to as "polydimethylsiloxane A9", having a vinyl group in an amount of 0.07 mole/100 g and a viscosity in a 30% solution in toluene of 15,000 mPa·s,

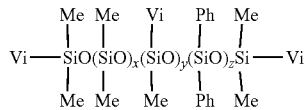

wherein x=6,070, y=330 and z=0, 83.3 parts of a 60% solution of the polysiloxane B in toluene, and 33.4 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 2.69 parts of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Comparative Example 2

A solution was prepared by mixing 35 parts of a polydimethylsiloxane of the following formula, hereinafter referred to as "polydimethylsiloxane A10", having a vinyl group in an amount of 0.001 mole/100 g and a viscosity in a 30% solution in toluene of 20,000 mPa·s,

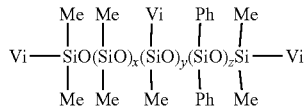

wherein x=7,400, y=4 and z=0, 108.3 parts of a 60% solution of the polysiloxane B in toluene, and 23.4 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 0.13 part of the polyorganosiloxane C1, and 0.20 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Comparative Example 3

A solution was prepared by mixing 70 parts of a polydimethylsiloxane of the following formula, hereinafter referred to as "polydimethylsiloxane A11", having a vinyl group in an amount of 0.0005 mole/100 g and a viscosity in a 30% solution in toluene of 16,000 mPa·s, 50 parts of a 60% solution of the polysiloxane B in toluene,

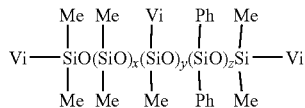

wherein x=6,600, y=1 and z=0, 50 parts of a 60% solution of the polysiloxane B in toluene, and 46.7 parts of toluene, to which 0.5 part of 28% solution of ammonium in water was added and mixed at room temperature for 6 hours.

Then, the mixture was heated under reflux for 4 hours to removed ammonia gas and water. After cooled, fresh toluene was added to compensate for distilled off toluene. To 100 parts of the reaction product thus obtained, 0.20 part of the polyorganosiloxane C1, and 0.22 part of ethynylcyclohexanol were added and mixed.

To 100 parts of the mixture obtained containing about 60 wt % of siloxanes, 50 parts of toluene, and 0.5 part of the platinum complex solution were further added to prepare a silicone composition containing about 40 wt % of siloxanes.

The silicone composition for pressure sensitive adhesive thus obtained was evaluated according to the aforesaid test methods.

Comparative Example 4

A solution was prepared by mixing 100 parts of a polydimethylsiloxane of the following formula, hereinafter referred to as "polydimethylsiloxane A12", having a vinyl group in an amount of 0.002 mole/100 g and a viscosity in a 30% solution in toluene of 3,500 mPa·s,

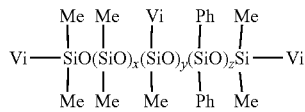

wherein x=3,400, y=3 and z=0, and 66.7 parts of toluene. To 100 parts of the solution, 0.38 part of the polyorganosiloxane C1, and 0.20 part of ethynylcyclohexanol were added and mixed.

To 100 parts of the mixture obtained containing about 60 wt % of siloxane, 50 parts of toluene, and 0.5 part of the platinum complex solution were further added to prepare a silicone composition containing about 40 wt % of siloxanes. The silicone composition for pressure sensitive adhesive thus obtained was evaluated according to the aforesaid test methods.

Comparative Example 5

Mixed were 50 parts of a polydimethylsiloxane of the following formula, hereinafter referred to as "polydimethylsiloxane A13", having a vinyl group in an amount of 0.063 mole/100 g and a viscosity of 60 mPa·s,

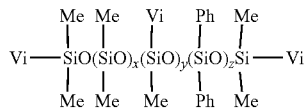

wherein x=40, y=0 and z=0, 83.3 parts of a 60% solution of the polysiloxane B in toluene, and 4.85 parts of a polymethylhydrosiloxane of the following formula, hereinafter referred to as "polymethylhydrosiloxane C2", having SiH groups,

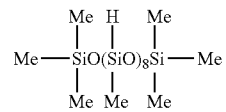

from which mixture toluene was removed by heating the mixture at a temperature of 90° C. and at a reduced pressure. After cooling the mixture; 0.2 part of ethynylcyclohexanol, and 1.0 part of the solution of a complex of platinum with a siloxane having a vinyl group in toluene in a concentration as platinum of 0.05 wt % were added to 100 parts of the mixture to prepare solvent-free composition, which was evaluated according to the aforesaid test methods.

Comparative Example 6

A 30 wt % of solution of a commercially available two-pack type weak adhesive composition comprising an acrylic resin and an isocyanate hardener in toluene was prepared, which solution was evaluated according to the aforesaid test methods. The tests of bubble entrapment, holding power, peelability, and adhesion strength were performed on a film prepared by applying the composition directly on a corona-treated polyethylene film having a thickness of 75 μm without the silicone primer treatment.

Table 1 shows test results of pressure sensitive adhesive films prepared from each composition prepared above.

TABLE 1

| | Mass ratio of (A)/(B) | Vinyl content of (A) (mole/100 g) | Corona-treated | Primer-treated | Adhesion (N/10 mm) | Holding power (mm) | Bubble entrapment | Peelability | Adhesion to substrate film |
|---|---|---|---|---|---|---|---|---|---|
| Example 1-1 | A1/B = 90/10 | 0.002 | Yes | Yes | 0.03 | 0.01 | A | A | A |
| Ref. Ex.*¹ 1 | A1/B = 90/10 | 0.002 | No | No | — | — | — | — | C |
| Ref. Ex. 2 | A1/B = 90/10 | 0.002 | Yes | No | — | — | — | — | B |
| Example 1-2 | A1/B = 90/10 | 0.002 | No | Yes | 0.03 | 0.01 | A | A | A |
| Example 2 | A2/B = 70/30 | 0.002 | Yes | Yes | 0.20 | 0.01 | A | A | A |
| Example 3 | A3/B = 70/30 | 0.002 | Yes | Yes | 0.27 | 0.01 | A | A | A |
| Example 4 | A4/B = 75/25 | 0.04 | Yes | Yes | 0.01 | 0.01 | A | A | A |
| Example 5 | A5/B = 50/50 | 0.04 | Yes | Yes | 0.02 | 0.01 | A | A | A |
| Example 6 | A6/B = 50/50 | 0.007 | Yes | Yes | 0.45 | 0.01 | A | A | A |
| Example 7 | A7/B = 40/60 | 0.02 | Yes | Yes | 0.10 | 0.01 | A | A | A |
| Example 8 | A8/B = 50/50 | 0.001 | Yes | Yes | 1.1 | 0.02 | A | A | A |
| Comp. Ex.*² 1 | A9/B = 50/50 | 0.07 | Yes | Yes | 0.00 | Slid off | Not adhered | — | A |
| Comp. Ex. 2 | A10/B = 35/65 | 0.001 | Yes | Yes | 4.3 | 0.02 | A | C | A |
| Comp. Ex. 3 | A11/B = 70/30 | 0.0005 | Yes | Yes | Not hardened | — | — | — | — |
| Comp. Ex. 4 | A12/B = 100/0 | 0.002 | Yes | Yes | 0.01 | Slid off | A | A | A |
| Comp. Ex. 5 | A13/B = 35/65 | 0.04 | Yes | Yes | 0.04 | 0.01 | A | A | C |
| Comp. Ex. 6 | Acrylic | — | Yes | No | 0.38 | 0.15 | C | C | A |

*¹Referential Example
*²Comparative Example

As shown in the Table 1, the present pressure sensitive adhesive films were applied on a glass without entrapping bubbles. The films had adhesion strength suitable for use as a film for a flat panel display.

The invention claimed is:

1. A pressure sensitive adhesive film comprising:
   a substrate film; and
   a pressure sensitive adhesive layer formed on a surface of the substrate film, said pressure sensitive adhesive layer being prepared from a silicone composition comprising:
   (A) a diorganopolysiloxane having at least two alkenyl groups per molecule;
   (B) a polyorganosiloxane comprising an $R^1{}_3SiO_{0.5}$ unit and an $SiO_2$ unit in a molar ratio of the $R^1{}_3SiO_{0.5}$ unit to the $SiO_2$ unit of from 0.6 to 1.7, wherein $R^1$ is a monovalent hydrocarbon group having 1 to 10 carbon atoms;
   (C) a polyorganosiloxane having an SiH bond, characterized in that
   the diorganopolysiloxane (A) contains alkenyl groups in an amount of from 0.002 to 0.05 mole per 100 g of the diorganopolysiloxane (A),
   the polyorganosiloxane (C) is contained in such an amount that a molar ratio of the SiH bond to the alkenyl group of the diorganopolysiloxane (A) ranges from 0.5 to 20,
   a mass ratio of the diorganopolysiloxane (A) to the polyorganosiloxane (B) comprising an $R^1{}_3SiO_{0.5}$ unit and an $SiO_2$ unit ranges from 95/5 to 55/45, and
   the adhesive layer has an adhesion strength ranging from 0.01 to 0.5 N/10 mm measured according to the 180-degree peel test specified in the Japanese Industrial Standard Z 0237 on a film composed of a polyethylene terephthalate film having a thickness of 25 μm and the adhesive layer having a thickness of 30 μm provided on the polyethylene terephthalate film, wherein said pressure sensitive adhesive film is transparent and is suitable to apply on a surface of a flat panel display.

2. The pressure sensitive adhesive film according to claim 1, further comprising:
   0 to 8.0 parts by mass, based on a total of (A) and (B) of 100 parts by mass, of a retarder (D);
   5 to 2,000 ppm, calculated as platinum, based on a total of (A) and (B) of 100 parts by mass, of a platinum catalyst (E); and
   25 to 900 parts by mass, based on a total of (A) and (B) of 100 parts by mass, of an organic solvent (F).

3. The pressure sensitive adhesive film according to claim 1, wherein a mass ratio of the diorganopolysiloxane (A) to the polyorganosiloxane (B) is 55/45 and the alkenyl group is contained in an amount of from 0.005 to 0.05 mole per 100 g of the diorganopolysiloxane (A).

4. The pressure sensitive adhesive film according to claim 1, wherein a part or all of the components (A) and (B) is contained as a product prepared by reacting the part or all of the components (A) and (B) in the presence of a basic catalyst.

5. The pressure sensitive adhesive film according to claim 1 or claim 2, wherein the alkenyl group of the diorganopolysiloxane (A) is a vinyl group.

6. The pressure sensitive adhesive film according to claim 1, wherein the diorganopolysiloxane (A) is represented by the following formula:

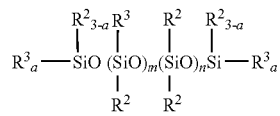

wherein $R^2$ is a substituted or unsubstituted monovalent hydrocarbon group which does not have an aliphatic unsaturated bond, $R^3$ is an organic group having an alkenyl group, "a" is an integer of from 0 to 2, "m" is an integer of 0 or larger, provided that "in" is 2 or larger when "a" is zero, "n" is an integer of 10 or larger, with a sum of "m" and "n" being such that the diorganopolysiloxane has a viscosity of 10 mPa·s or larger.

7. The pressure sensitive adhesive film according to claim 1, wherein the film has a primer layer between the substrate film and the pressure sensitive adhesive layer.

8. The pressure sensitive adhesive film according to claim 7, wherein a surface of the substrate film has been corona-treated and the primer layer is placed on the corona-treated surface.

9. The pressure sensitive adhesive film according to claim 1, wherein the silicone composition consists of the aforesaid components (A), (B), and (C) and at least one component selected from non-reactive polyorganosiloxanes having no alkenyl group, antioxidants, photostabilizers, flame retardants and antistatic agents.

10. The pressure sensitive adhesive film according to claim 2, wherein the silicone composition consists of the aforesaid components (A), (B), (C), (D), (E), and (F) and at least one component selected from non-reactive polyorganosiloxanes having no alkenyl group, antioxidants, photostabilizers, flame retardants, and antistatic agents.

* * * * *